United States Patent
Verma et al.

(10) Patent No.: US 10,258,975 B2
(45) Date of Patent: Apr. 16, 2019

(54) POLYMERIC NANOCOMPOSITE FILMS WITH EMBEDDED CHANNELS AND METHODS FOR THEIR PREPARATION AND USE

(71) Applicant: INDIAN INSTITUTE OF TECHNOLOGY KANPUR, Kanpur (IN)

(72) Inventors: Nishith Verma, Kanpur (IN); Janakarajan Ramkumar, Kanpur (IN); Prateek Khare, Kanpur (IN)

(73) Assignee: INDIAN INSTITUTE OF TECHNOLOGY KANPUR, Uttar Pradesh (IN)

( * ) Notice: Subject to any disclaimer, the term of this patent is extended or adjusted under 35 U.S.C. 154(b) by 171 days.

(21) Appl. No.: 15/115,263

(22) PCT Filed: Jan. 20, 2015

(86) PCT No.: PCT/IB2015/050422
§ 371 (c)(1),
(2) Date: Jul. 28, 2016

(87) PCT Pub. No.: WO2015/114486
PCT Pub. Date: Aug. 6, 2015

(65) Prior Publication Data
US 2017/0043331 A1    Feb. 16, 2017

(30) Foreign Application Priority Data
Jan. 29, 2014  (IN) .............................. 264/DEL/2014

(51) Int. Cl.
*B01J 21/18* (2006.01)
*B01J 31/06* (2006.01)
(Continued)

(52) U.S. Cl.
CPC .............. *B01J 31/06* (2013.01); *B01J 21/18* (2013.01); *B01J 23/50* (2013.01); *B01J 23/745* (2013.01);
(Continued)

(58) Field of Classification Search
CPC . B01J 21/18; B01J 23/50; B01J 23/745; B01J 31/06; B01J 35/04; B01J 37/04;
(Continued)

(56) References Cited

U.S. PATENT DOCUMENTS 8,137,554 B2   3/2012   Jovanovic et al.
8,222,166 B2   7/2012   Chu et al.
(Continued)

FOREIGN PATENT DOCUMENTS

CN    102580581 A    7/2012
WO    2013013070 A2  1/2013

OTHER PUBLICATIONS

Mekala Bikshapathi et al., "Fe-nanoparticles Dispersed Carbon Micro and Nanofibers: Surfactant-mediated Preparation and Application to the Removal of Gaseous VOCs", Colloids and Surfaces A: Physicochemical and Engineering Aspects, Apr. 5, 2012, pp. 46-55, vol. 399.

(Continued)

*Primary Examiner* — Lan Vinh

(57) ABSTRACT

Method of forming micro channels in a polymeric nanocomposite film is provided. The method includes combining one or more monomers to form a mixture and adding a plurality of carbon fibers with metal nanoparticles dispersed therein to the mixture prior to or concurrently with formation of a polymer from the monomers. The method also includes adding at least one hydrophobic agent and at least one plasticizer to the polymer to form the polymeric nano- (Continued)

composite film and forming a plurality of laser-etched micro channels in a surface of the polymeric nanocomposite film.

17 Claims, 4 Drawing Sheets

(51) Int. Cl.

| | |
|---|---|
| *C02F 1/28* | (2006.01) |
| *B01J 23/50* | (2006.01) |
| *B01J 23/745* | (2006.01) |
| *B01J 35/04* | (2006.01) |
| *B01J 37/04* | (2006.01) |
| *B01J 37/34* | (2006.01) |
| *C02F 101/10* | (2006.01) |
| *C02F 101/14* | (2006.01) |
| *C02F 101/20* | (2006.01) |
| *C02F 101/22* | (2006.01) |
| *C02F 101/34* | (2006.01) |

(52) U.S. Cl.
CPC .............. *B01J 35/04* (2013.01); *B01J 37/04* (2013.01); *B01J 37/341* (2013.01); *C02F 1/281* (2013.01); *C02F 1/283* (2013.01); *C02F 1/285* (2013.01); *C02F 1/288* (2013.01); *C02F 2101/103* (2013.01); *C02F 2101/14* (2013.01); *C02F 2101/20* (2013.01); *C02F 2101/22* (2013.01); *C02F 2101/345* (2013.01); *C02F 2303/04* (2013.01)

(58) Field of Classification Search
CPC ......... B01J 37/341; C02F 1/281; C02F 1/283; C02F 1/285; C02F 1/288; C02F 2101/103; C02F 2101/14; C02F 2101/20; C02F 2101/22; C02F 2101/345; C02F 2303/04
USPC ........... 216/62, 65, 79, 81, 56; 252/513, 514
See application file for complete search history.

(56) References Cited

U.S. PATENT DOCUMENTS

| | | | |
|---|---|---|---|
| 8,226,878 B2 | 7/2012 | Huo et al. | |
| 8,242,050 B2 | 8/2012 | Lu et al. | |
| 2006/0213881 A1 | 9/2006 | Oliphant et al. | |
| 2007/0003749 A1 | 1/2007 | Asgari | |
| 2009/0142638 A1 | 6/2009 | Katayama | |
| 2010/0224555 A1 | 9/2010 | Hoek et al. | |
| 2010/0233835 A1* | 9/2010 | Kusunoki | H01L 33/0095 438/33 |
| 2012/0058063 A1* | 3/2012 | Tonkovich | B01F 3/0807 424/59 |
| 2012/0196454 A1* | 8/2012 | Shah | B23K 26/38 438/795 |
| 2012/0276343 A1 | 11/2012 | Huo et al. | |
| 2013/0099179 A1* | 4/2013 | Vanheusden | H01B 1/22 252/514 |
| 2014/0011112 A1* | 1/2014 | Guo | H01M 8/1004 429/482 |

OTHER PUBLICATIONS

Mekala Bikshapathi et al., "Modification of Activated Carbon Fiber by Metal Dispersion and Surface Functionalization for the Removal of 2-Chloroethanol", Industrial and Engineering Chemistry Research, Jan. 14, 2011, pp. 13092-13104, vol. 50, No. 23.

Mekala Bikshapathi et al., "Preparation of Carbon Molecular Sieves from Carbon Micro and Nanofibers for Sequestration of CO2", Chemical Engineering Research and Design, Sep. 2011, pp. 1737-1746, vol. 89.

Mekala Bikshapathi et al., "Surfactant-Enhanced Multiscale Carbon Webs Including Nanofibers and Ni-Nanoparticles for the Removal of Gaseous Persistent Organic Pollutants," Industrial & Engineering Chemistry Research, 2012, pp. 2104-2112, vol. 51, No. 4.

Anindita Chakraborty et al., "Adsorbents Based on Carbon Microfibers and Carbon Nanofibers for the Removal of Phenol and Lead from Water", Journal of Colloid and Interface Science, Jul. 1, 2011, pp. 228-239, vol. 359, Issue 1.

Chia Hsiang Chen et al., "Antimicrobial Susceptibility Testing Using High Surface-to-Volume Ratio Microchannels", Analytical Chemistry, Jan. 7, 2010, pp. 1012-1019, vol. 82, No. 3.

V. Cominos et al., "Selective Oxidation of Carbon Monoxide in a Hydrogen-rich Fuel Cell Feed Using a Catalyst Coated Microstructured Reactor", Catalysis Today, Dec. 15, 2005, pp. 140-153, vol. 110.

E.R. Delsman et al., "Design and Operation of a Preferential Oxidation Microdevice for a Portable Fuel Processor", Chemical Engineering Science, 2004, pp. 4795-4802, vol. 59.

E.R. Delsman et al., "Experiments and Modeling of An Integrated Preferential Oxidation-Heat Exchanger Microdevice", Chemical Engineering Journal, 2004, pp. 123-131, vol. 101.

International Search Report and Written Opinion of the International Searching Authority, International application No. PCT/IB2015/50422, dated Jul. 8, 2015.

Niket S. Kaisare et al., "A Review on Microcombustion: Fundamentals, Devices and Applications", Progress in Energy and Combustion Science, Jun. 2012, pp. 321-359, vol. 38.

Hari Katepalli et al., "Synthesis of Hierarchical Fabrics by Electrospinning of PAN Nanofibers on Activated Carbon Microfibers for Environmental Remediation Applications", Chemical Engineering Journal, 2011, pp. 1194-1200, vol. 171.

Jarapala Ravi Naik et al., "Preparation, Surface Functionalization, and Characterization of Carbon Micro Fibers for Adsorption Applications", Environmental Engineering Science, 2011, pp. 725-733, vol. 28, No. 10.

Rainer Paetzel et al., "Excimer Lasers Support Industrial Micromachining Diversity", Laser Technik Journal, Feb. 14, 2007, vol. 4, Issue 1.

Palani I.A. et al., "Laser Based Surface Processing of Engineering Materials—State of Art", International Journal on Design and Manufacturing Technologies, Jul. 2008, pp. 9, vol. 2, No. 1.

Ajit K. Sharma et al., "Preparation of Novel Carbon MicrofiberlCarbon Nanofiber-Dispersed Polyvinyl Alcohol-based Nanocomposite Material for Lithium-ion Electrolyte Battery Separator", Materials Science and Engineering: C, 2013, pp. 1702-1709, vol. 33.

Shiv Singh et al., "Preparation of Surfactant-Mediated Silver and Copper Nanoparticles Dispersed in Hierarchical Carbon Micro-Nanofibers for Antibacterial Applications", New biotechnology, Sep. 2013, pp. 656-665, vol. 30, No. 6.

A.Y. Tonkovich et al., "Microchannel Process Technology for Compact Methane Steam Reforming", Chemical Engineering Science, 2004, pp. 4819-4824, vol. 59.

\* cited by examiner

POLYMERIC NANOCOMPOSITE FILMS WITH EMBEDDED CHANNELS AND METHODS FOR THEIR PREPARATION AND USE

CROSS-REFERENCE TO RELATED APPLICATIONS

The present application is a U.S. national stage filing under 35 U.S.C. § 371 of International Application PCT/IB15/50422, filed Jan. 20, 2015 and entitled "POLYMERIC NANOCOMPOSITE FILMS WITH EMBEDDED CHANNELS AND METHODS FOR THEIR PREPARATION AND USE." The International Application claims priority to Indian Patent Application 264/DEL/2014, filed Jan. 29, 2014. The Indian Patent Application and the International Application, including any appendices or attachments thereof, are hereby incorporated by reference in their entirety.

BACKGROUND

Antibacterial properties of metal nanoparticles such as silver (Ag) and copper (Cu) nanoparticles are well known. However, in-situ dispersion of metal nanoparticles on a substrate is a challenge. Moreover, weak adhesion of the metal nanoparticles to the substrates can result in leaching when the substrate comes into contact with a fluid.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming micro channels in a polymeric nanocomposite film are provided. The method includes combining one or more monomers to form a mixture and adding a plurality of carbon fibers with metal nanoparticles dispersed therein to the mixture prior to or concurrently with formation of a polymer from the monomers. The method also includes adding at least one hydrophobic agent and at least one plasticizer to the polymer to form the polymeric nanocomposite film and forming a plurality of laser-etched micro channels in a surface of the polymeric nanocomposite film.

In accordance with another aspect, methods of forming micro channels embedded in a polymeric nanocomposite film are provided. The method includes initiating esterification of vinyl acetate for forming polyvinyl alcohol (PVA) and adding a plurality of carbon fibers with metal nanoparticles dispersed therein to the vinyl acetate prior to or concurrently with formation of the polyvinyl alcohol (PVA). The method also includes adding at least one hydrophobic agent and at least one plasticizer to the PVA and the plurality of carbon fibers with metal nanoparticles to form the polymeric nanocomposite film and forming a plurality of micro channels in a surface of the polymeric nanocomposite film.

In accordance with another aspect, polymeric nanocomposite films with embedded micro channels are provided. The polymeric nanocomposite film includes a polymeric material having a plurality of hybrid carbon fibers with metal nanoparticles embedded therein. The plurality of hybrid carbon fibers includes carbon microfibers and carbon nanofibers. The polymeric nanocomposite film also includes a plurality of micro channels formed in the polymeric material.

In accordance with another aspect, water purifiers are provided. The water purifier includes a plurality of micro channels embedded in a polymeric nanocomposite film having a plurality of hybrid carbon fibers and metal nanoparticles embedded within a polymeric material. The polymeric nanocomposite film includes a plurality of micro channels formed therein.

In accordance with another aspect, methods of water purification are provided. The method includes contacting water with a polymeric nanocomposite film having a plurality of carbon fibers and metal nanoparticles embedded therein. The polymeric nanocomposite film includes a plurality of micro channels formed therein and purifying the water as the metal nanoparticles embedded within the polymeric nanocomposite film are exposed to the water passing through the plurality of micro channels.

DETAILED DESCRIPTION

Figure 1:
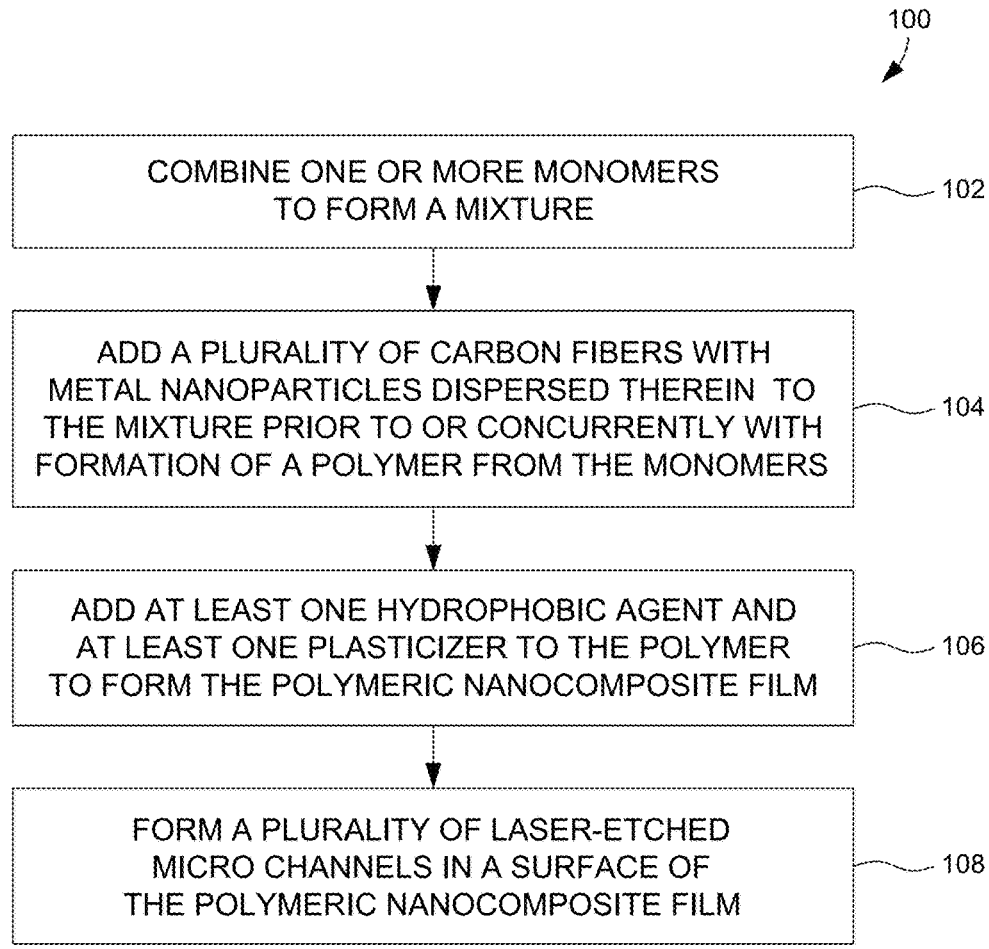
FIG. 1 is an example flow diagram of an embodiment of a method of forming micro channels embedded in a polymeric nanocomposite film.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming channels embedded in polymeric nanocomposite films. The present technique provides a polymeric nanocomposite film that includes a polymeric material having a plurality of hybrid carbon fibers with metal nanoparticles embedded therein. The polymeric nanocomposite film also includes a plurality of channels formed in the polymeric material. The polymeric nanocomposite film with embedded micro channels disclosed herein has enhanced mechanical strength and provides substantially large adsorptive/catalytic surface area. Such polymeric nanocomposite films may be used in water filters, purifiers and in pharmaceutical industries for treatment of effluents.

In FIG. 1, an example flow diagram 100 of an embodiment for a method of forming micro channels in a polymeric nanocomposite film is illustrated. At block 102, one or more monomers are combined to form a mixture. Examples of the one or more monomers include, but are not limited to, methyl acetate, vinyl acetate, methyl acrylate, ethyl acrylate, or combinations thereof.

At block 104, a plurality of carbon fibers with metal nanoparticles dispersed therein are added to the mixture prior to or concurrently with formation of a polymer from the monomers. Examples of the plurality of carbon fibers include, but are not limited to, carbon microfibers, carbon nanofibers (CNFs), or combinations thereof. Examples of the polymer include, but are not limited to, polyvinyl alcohol (PVA), polyvinyl acetate (PVAc), polypropylene (PP), polyethylene (PE), polyvinylidene fluoride (PVDF), or combinations thereof. In one example, the carbon fibers are added to the mixture concurrently with formation of the polymer. In another example, the carbon fibers are added to the mixture upon initiation of formation of the polymer. Furthermore, at least one alkali is added to one or more monomers before forming the polymeric nanocomposite film.

In one example, the plurality of carbon fibers are formed by chemical vapor deposition using one or more metal catalysts. In this embodiment, the plurality of carbon fibers are dispersed with a surfactant and the dispersed carbon fibers are milled to form milled carbon fibers. Examples of the surfactant include, but are not limited to, sodium dodecyl sulphate (SDS), tri-n-octylphosphine (TOPO), triton X-100, cetyltrimethylammonium bromide (CTAB), cetyl trimethylammonium chloride (CTAC), cetylpyridinium chloride (CPC), or combinations thereof.

Moreover, the milled carbon fibers are mixed with the mixture concurrently with formation of the polymer. In one example, the dispersed carbon fibers are ball milled. In another example, the plurality of carbon microfibers and carbon nanofibers are milled for a time period of about 1 hour to about 8 hours. Specific examples of the milling time include about 1 hour, about 2 hours, about 3 hours, about 4 hours, about 5 hours, about 6 hours, about 7 hours, about 8 hours, and ranges between any two of these values (including endpoints). In another example, the plurality of carbon microfibers and carbon nanofibers are milled at a milling rate of about 150 revolutions per minute (rpm) to about 350 rpm. Specific examples of the milling rate include about 150 rpm, about 200 rpm, about 250 rpm, about 300 rpm, about 350 rpm, and ranges between any two of these values (including endpoints).

In some examples, the plurality of carbon microfibers have an average diameter of about 2 micrometers (μm) to about 20 μm. Specific examples of the average diameter of the carbon microfibers include about 2 μm, about 4 μm, about 6 μm, about 8 μm, about 10 μm, about 12 μm, about 14 μm, about 16 μm, about 18 μm, about 20 μm, and ranges between any two of these values (including end points). In some other examples, the plurality of carbon nanofibers have an average diameter of about 40 nanometers (nm) to about 150 nm. Specific examples of the average diameter of the carbon nanofibers include about 40 nm, about 60 nm, about 80 nm, about 100 nm, about 120 nm, about 140 nm, about 150 nm, and ranges between any two of these values (including end points). In one example, the milled carbon fibers have an average diameter of about 250 nanometers (nm) to about 650 nm. Specific examples of the milled carbon fibers average diameter include about 250 nm, about 300 nm, about 350 nm, about 400 nm, about 450 nm, about 500 nm, about 550 nm, about 600 nm, about 650 nm, and ranges between any two of these values (including end points).

Examples of the metal nanoparticles include, but are not limited to, nickel (Ni), iron (Fe), silver (Ag), copper (Cu), zinc (Zn), aluminum (Al), gold (Au), Cu—Ag (copper-silver), Zn—Ag (zinc-silver), or combinations thereof. In one example, the metal nanoparticles have an average particle size of about 20 nanometers (nm) to about 180 nm. Specific examples of the average particle size include, but are not limited to, about 20 nm, about 40 nm, about 60 nm, about 80 nm, about 100 nm, about 120 nm, about 140 nm, about 160 nm, about 180 nm, and ranges between any two of these values (including end points).

At block 106, at least one hydrophobic agent and at least one plasticizer is added to the polymer to form the polymeric nanocomposite film. Examples of the at least one hydrophobic agent include, but are not limited to, acrylonitrile, methyl acrylate, vinyl acetate, methylmethacrylate, or combinations thereof. Examples of the at least one plasticizer include, but are not limited to, citrates, phthalates, lignosulphonates, or combinations thereof. In some examples, the plasticizer includes polyethylene glycol, propylene glycol, triethyl citrate, diethyl phthalate, dibutyl phthalate, dibutyl sebacate, or combinations thereof.

In some embodiments, at least one initiator is added to the polymer and the plurality of carbon fibers with metal nanoparticles prior to or concurrently with formation of the polymer. Examples of the at least one initiator include, but are not limited to, potassium per sulfate, ammonium persulphate, 2-2'Azo bisisobutyronitrile, benzoyl peroxide, hydrogen peroxide or combinations thereof.

Further, the polymer is casted on a substrate and is subsequently dried to form the polymeric nanocomposite film. Examples of the substrate include, but are not limited to, a teflon sheet, glass plate, nylon sheet, or combinations thereof. In one example embodiment, the polymeric nanocomposite film is dried for a time period of about 6 hours to about 48 hours. Specific examples of the drying time include, about 6 hours, about 9 hours, about 12 hours, about 15 hours, about 18 hours, about 21 hours, about 24 hours, about 27 hours, about 30 hours, about 33 hours, about 36 hours, about 39 hours, about 42 hours, about 45 hours, about 48 hours, and ranges between any two of these values (including end points). In another example, the polymeric nanocomposite film is dried at a temperature of about 60° C. to about 180° C. Specific examples of the drying temperature include, about 60° C., about 80° C., about 100° C., about 120° C., about 140° C., about 160° C., about 180° C., and ranges between any two of these values (including end points).

In some examples, a thickness of the polymeric nanocomposite film is about 0.5 millimeter (mm) to about 2.5 mm. Specific examples of the thickness of the polymeric nanocomposite film include, about 0.5 mm, about 1 mm, about 1.5 mm, about 2 mm, about 2.5 mm, and ranges between any two of these values (including endpoints). In some examples, the polymeric nanocomposite film has an absorptive surface area of about $1\times10^5$ $m^2/m^3$ to about $1\times10^8$ $m^2/m^3$. Specific examples of the absorptive surface area of the polymeric nanocomposite film include about $1\times10^5$ $m^2/m^3$, about $1\times10^6$ $m^2/m^3$, about $1\times10^7$ $m^2/m^3$, about $1\times10^8$ $m^2/m^3$, and ranges between any two of these values (including endpoints).

At block 108, a plurality of laser-etched micro channels are formed in a surface of the polymeric nanocomposite film. In one embodiment, the micro channels are formed by exposing the polymeric nanocomposite film to electromagnetic radiation. In this example, the micro channels are formed in the polymeric nanocomposite film using a pulsed nanosecond ultraviolet laser. In one example, ultraviolet radiation applied by the ultraviolet laser has a wavelength of about 100 nanometers (nm) to about 400 nm. Specific examples of the ultraviolet radiation wavelength include about 100 nm, about 200 nm, about 300 nm, about 400 nm, and ranges between any two of these values (including endpoints). In another example, ultraviolet radiation applied by the ultraviolet laser has a pulse energy of about 1 milli joule (mJ) to about 700 mJ. Specific examples of the pulse energy include about 1 mJ, about 100 mJ, about 200 mJ, about 300 mJ, about 400 mJ, about 500 mJ, about 600 mJ, about 700 mJ, and ranges between any two of these values (including endpoints).

In another example, ultraviolet radiation applied by the ultraviolet laser has a pulse frequency of about 1 Hertz (Hz) to about 60 Hz. Specific examples of the pulse frequency of the ultraviolet radiation include about 1 Hz, about 10 Hz, about 20 Hz, about 30 Hz, about 40 Hz, about 50 Hz, about 60 Hz, and ranges between any two of these values (including endpoints). In another example, the ultraviolet radiation applied by the ultraviolet laser has a scanning rate of about 0.1 millimeter per seconds (mm/s) to about 1 mm/s. Specific examples of the scanning rate include about 0.1 mm/s, about 0.2 mm/s, about 0.3 mm/s, about 0.4 mm/s, about 0.5 mm/s, about 0.6 mm/s, about 0.7 mm/s, about 0.8 mm/s, about 0.9 mm/s, about 1 mm/s, and ranges between any two of these values (including endpoints). The laser-etched channels formed in the surface of the polymeric film will be described below.

Figure 2:
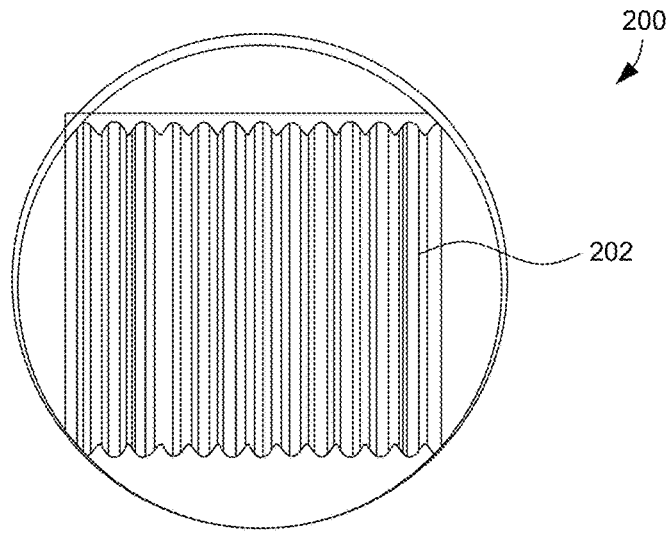
FIG. 2 is an example a polymeric nanocomposite film with micro channels.

In FIG. 2, an example of a polymeric nanocomposite film 200 with embedded micro channels 202 is provided. The polymeric nanocomposite film 200 includes a polymeric material having a plurality of hybrid carbon fibers with metal nanoparticles embedded therein. The plurality of hybrid carbon fibers includes carbon microfibers and carbon nanofibers. The polymeric nanocomposite film 200 also includes the plurality of micro channels 202 formed in the polymeric material. Examples of the polymeric material include, but are not limited to, polyvinyl alcohol (PVA), polypropylene (PP), polyethylene (PE), polyvinylidene fluoride (PVDF), or combinations thereof. Examples of the metal nanoparticles include, but are not limited to, nickel (Ni), iron (Fe), silver (Ag), copper (Cu), zinc (Zn), aluminum (Al), gold (Au), Cu—Ag (copper-silver), Zn—Ag (zinc-silver), or combinations thereof.

In one example, the metal nanoparticles have an average particle size of about 20 nanometers (nm) to about 180 nm. Specific examples of the average particle size of the metal nanoparticles include, but are not limited to, about 20 nm, about 40 nm, about 60 nm, about 80 nm, about 100 nm, about 120 nm, about 140 nm, about 160 nm, about 180 nm, and ranges between any two of these values (including endpoints).

In the illustrated embodiment, the micro channels 202 are formed by exposing the polymeric nanocomposite film 200 to electromagnetic radiation. In this example, the micro channels 202 are formed in the polymeric nanocomposite film using a pulsed nanosecond ultraviolet laser. In one example, the micro channels 202 have an average length of about 5 millimeter (mm) to about 30 mm. Specific examples of the length of the micro channels 202 include about 5 mm, about 10 mm, about 15 mm, about 20 mm, about 25 mm, about 30 mm, and ranges between any two of these values (including endpoints).

In another example, the micro channels 202 have an average width of about 50 micrometer (μm) to about 300 μm. Specific examples of the width of the micro channels 202 include about 50 μm, about 100 μm, about 150 μm, about 200 μm, about 250 μm, about 300 μm, and ranges between any two of these values (including endpoints). In another example, the micro channels 202 have an average depth of about 40 micrometer (μm) to about 150 μm. Specific examples of the depth of the micro channels 202 include about 40 μm, about 60 μm, about 80 μm, about 100 μm, about 120 μm, about 140 μm, about 150 μm, and ranges between any two of these values (including endpoints).

In certain embodiments, the polymeric nanocomposite film 200 of FIG. 1 forms a purification device. In some examples, the polymeric nanocomposite film 200 is used in water filters, purifiers for treatment of effluents such as in pharmaceutical industries. In one example, a water purifier is provided. The water purifier includes a plurality of micro channels embedded in a polymeric nanocomposite film. The polymeric nanocomposite film has a plurality of hybrid carbon fibers. The carbon fibers include metal nanoparticles added in-situ. Examples of the metal nanoparticles include, but are not limited to, nickel (Ni), iron (Fe), silver (Ag), copper (Cu), zinc (Zn), aluminum (Al), gold (Au), Cu—Ag (copper-silver), Zn—Ag (zinc-silver), or combinations thereof. In this example, the plurality of micro channels are formed by laser etching.

In this example, the metal nanoparticles are configured to purify water as the polymeric nanocomposite film is contacted with water. In one example embodiment, the water purifier is configured to substantially remove arsenic, phenol, chromium, fluoride, lead, vitamin B-12, *Escherichia coli, Staphylococus aureus*, or combinations thereof from water. In another example embodiment, the water purifier is configured to inhibitor prevent growth of bacteria in water.

Figure 3:
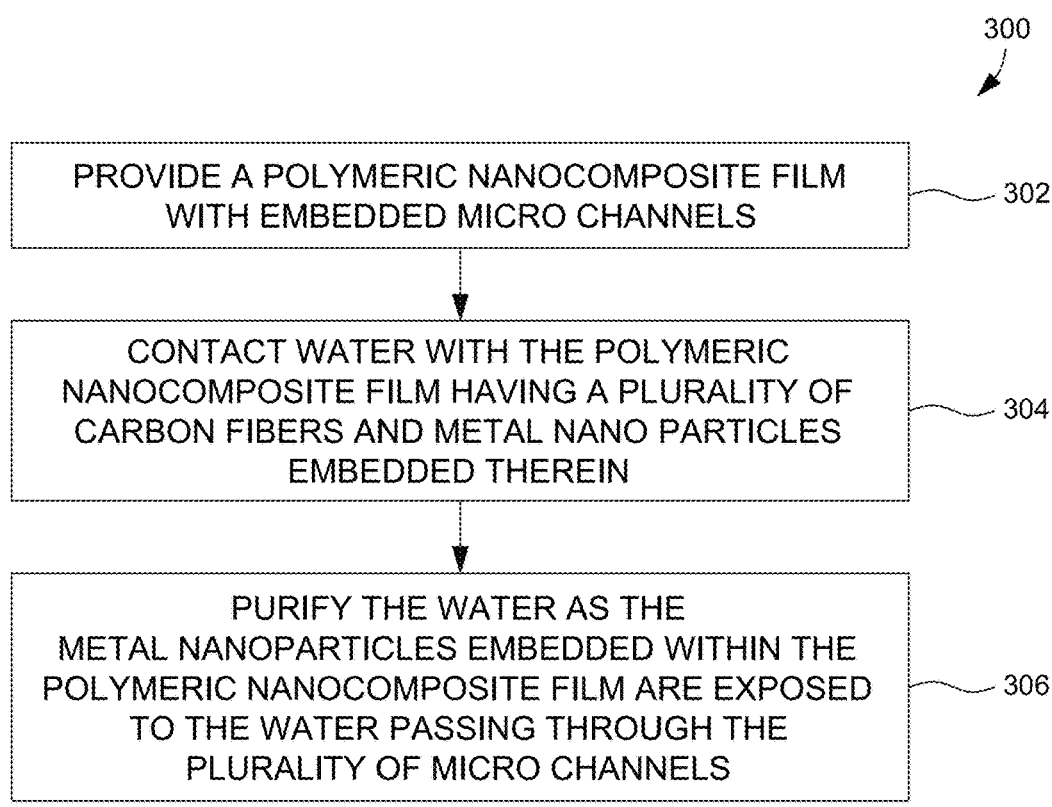
FIG. 3 is an example flow diagram of an embodiment of a method of water purification.

An example flow diagram 300 of an embodiment of a method of water purification is illustrated in FIG. 3. At block 302, a polymeric nanocomposite film with embedded micro channels is provided. The polymeric nanocomposite film includes a polymeric material having a plurality of hybrid carbon fibers with metal nanoparticles embedded therein. Examples of the polymeric material include, but are not limited to, polyvinyl alcohol (PVA), polypropylene (PP), polyethylene (PE), polyvinylidene fluoride (PVDF), or combinations thereof. Examples of the metal nanoparticles include, but are not limited to, nickel (Ni), iron (Fe), silver (Ag), copper (Cu), zinc (Zn), aluminum (Al), gold (Au), Cu—Ag (copper-silver), Zn—Ag (zinc-silver), or combinations thereof.

In some examples, a thickness of the polymeric nanocomposite film is about 0.5 millimeters (mm) to about 2.5 mm. Specific examples of the polymeric nanocomposite film thickness include, about 0.5 mm, about 1 mm, about 1.5 mm, about 2 mm, about 2.5 mm, and ranges between any two of these values (including endpoints). In some other examples, the polymeric nanocomposite film has an absorptive surface area of about $1\times10^5$ $m^2/m^3$ to about $1\times10^8$ $m^2/m^3$. Specific examples of the polymeric nanocomposite film absorptive surface area include about $1\times10^5$ $m^2/m^3$, about $1\times10^6$ $m^2/m^3$, about $1\times10^7$ $m^2/m^3$, about $1\times10^8$ $m^2/m^3$, and ranges between any two of these values (including endpoints). At block 304, water is contacted with a polymeric nanocomposite film having the plurality of carbon fibers and the metal nanoparticles embedded therein.

At block 306, the water is purified as the metal nanoparticles embedded within the polymeric nanocomposite film are exposed to the water passing through the plurality of micro channels. In one example embodiment, the polymeric nanocomposite film is configured to substantially remove arsenic, phenol, chromium, fluoride, lead, vitamin B-12, *Escherichia coli, Staphylococus aureus*, or combinations thereof from water. Further, the polymeric nanocomposite film is configured to inhibit growth of bacteria in water. It should be noted that the carbon fibers enhances the mechanical strength of the polymeric nanocomposite film and their functionalized graphitic surface with dispersed metal nanoparticles function as adsorbents and catalysts.

Figure 4:
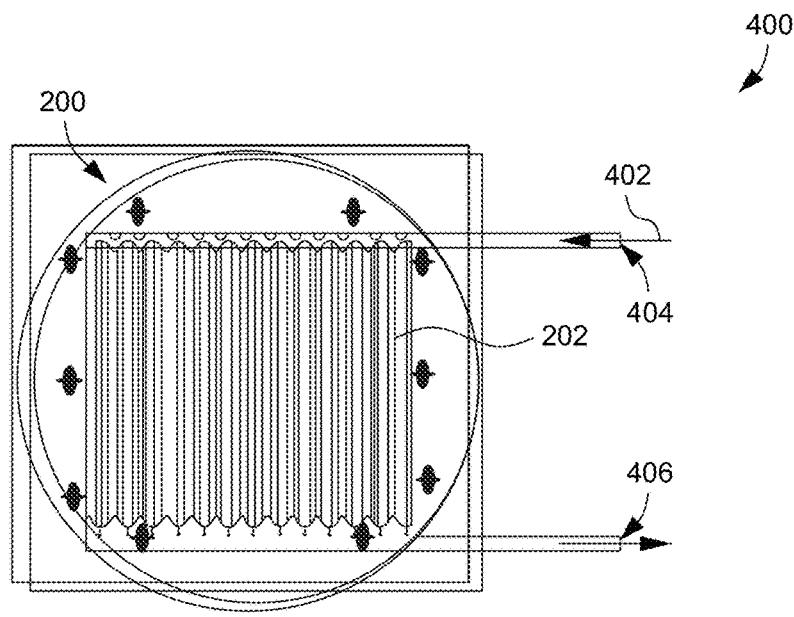
FIG. 4 illustrates an example implementation of a polymeric nanocomposite film as a purification device.

FIG. 4 illustrates an example implementation 400 of the polymeric nanocomposite film 200 as a purification device. In this embodiment, water 402 is passed through the plurality of micro channels 202 formed in the polymeric nanocomposite film 200 using an inlet 404 and an outlet 406. The water 402 is purified as the metal nanoparticles embedded within the polymeric nanocomposite film 200 are exposed to the water 402 passing through the plurality of micro channels 202 of the polymeric nanocomposite film 200. In one example, a water purification efficiency of the polymeric nanocomposite film 200 is about 92% to about 98%. Specific examples of the water purification efficiency include, about 92%, about 93%, about 94%, about 95%, about 96%, about 97%, about 98%, and ranges between any two of these values (including endpoints).

Figure 5:
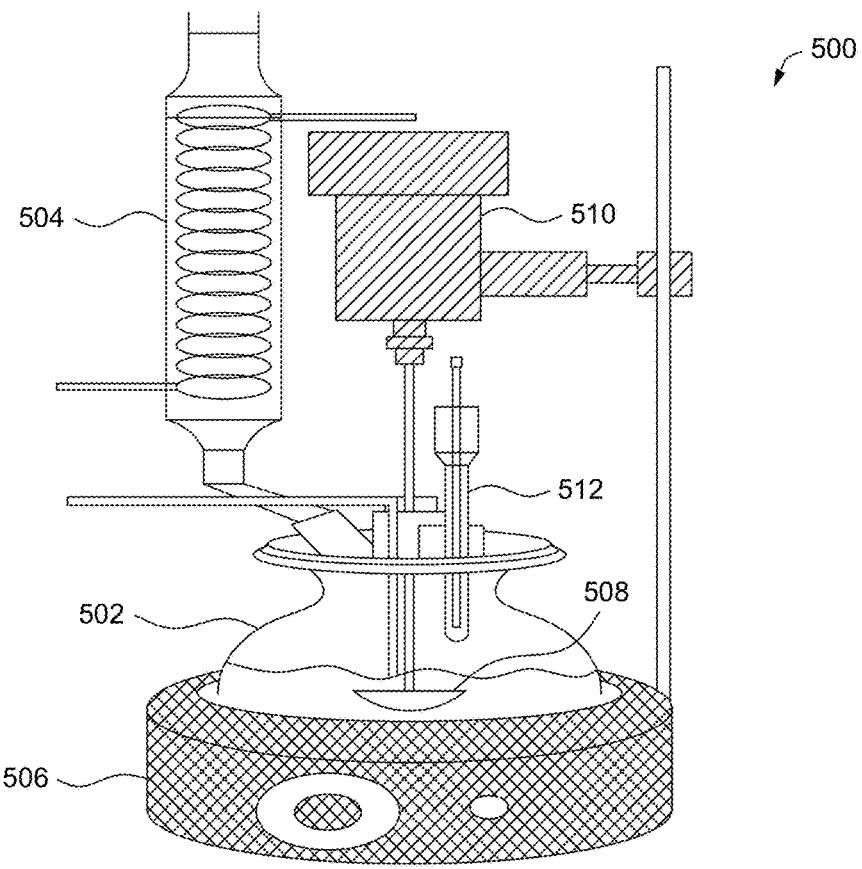
FIG. 5 is an example system used for forming a polymeric nanocomposite film.

FIG. 5 illustrates an example system 500 used for forming a polymeric nanocomposite film. The system 500 includes a container 502, a reflux condenser 504, a heating device 506 and a stirrer 508. In operation, one or more monomers are combined in a separate container (not shown) to form a mixture. In one example, methanol and polyvinyl acetate are combined to form the mixture. The mixture is then transferred to the container 502 and methanol and methyl acetate are added to the mixture. The mixture is stirred using the stirrer 508 at a suitable speed and sodium hydroxide solution is added to the mixture to form the polymer. In some examples, the mixture is stirred at a speed of about 100 revolutions per minute (rpm) to about 175 rpm. Specific examples of the speed include about 100 rpm, about 125 rpm, about 150 rpm, about 175 rpm, and ranges between any two of these values (including endpoints). In this exemplary configuration, a motor 510 is coupled to the stirrer 508 for rotating the stirrer 508 within the container 502.

The heating device 506 is configured to heat the container 502 to maintain suitable temperature of the mixture within the container 502. In one embodiment, the container is heated to a temperature of about 50° C. to about 90° C. while stirring the mixture to form the polymer. Specific examples of the temperature include about 50° C., about 60° C., about 70° C., about 80° C., about 90° C., and ranges between any two of these values (including endpoints). In one example, the temperature of the container is maintained at a temperature of about 60° C. The temperature of the mixture within the container 502 is measured using a temperature sensing device such as a thermometer 512. Moreover, reflux condensing water in the reflux condenser 504 can be used to maintain a desired level of the mixture in the container 502.

In this embodiment, the plurality of carbon fibers are formed by chemical vapor deposition using one or more metal catalysts. Further, carbon microfibers and carbon nanofibers dispersed in a surfactant are milled to form milled hybrid carbon fibers. The milled hybrid carbon fibers with dispersed metal nanoparticles may be synthesized separately and are added to the mixture prior to or concurrently with formation of the polymer. Examples of the surfactant includes, but are not limited to, sodium dodecyl sulphate (SDS), tri-n-octylphosphine (TOPO), triton X-100, cetyltrimethylammonium bromide (CTAB), cetyl trimethylammonium chloride (CTAC), cetylpyridinium chloride (CPC), or combinations thereof. Examples of the metal nanoparticles include, but are not limited to, nickel (Ni), iron (Fe), silver (Ag), copper (Cu), zinc (Zn), aluminum (Al), gold (Au), Cu—Ag (copper-silver), Zn—Ag (zinc-silver), or combinations thereof.

In one example embodiment, a composite material including carbon microfibers and carbon nanofibers is cut into small pieces and is dispersed in SDS-water solution. The solution containing the carbon microfibers and carbon nanofibers is transferred into a nano ball mill such as nano ball mill commercially available from Retsch, Germany and is milled to form the milled hybrid carbon fibers. In general, the solution can be milled for any length of time such as about 1 hour to about 8 hours. Specific examples of the milling time period include about 1 hours, about 2 hours, about 3 hours, about 4 hours, about 5 hours, about 6 hours, about 7 hours, about 8 hours, and ranges between any two of these values (including endpoints).

The milled hybrid carbon fibers with metal nanoparticles dispersed therein are then added to the polymer in the container 502. The container 502 having the polymer with the hybrid carbon fibers is maintained at a temperature of about 60° C. to about 80° C. to facilitate formation of the polymer. For example, the speed of the stirrer 508 is maintained at about 150 rpm to about 170 rpm.

A hydrophobic agent is then added to the polymer in the container 502 and the heating device 506 can be turned off to maintain the container 502 at room temperature. Examples of the hydrophobic agent include, but are not limited to, acrylonitrile, methyl acrylate, vinyl acetate, methylmethacrylate, or combinations thereof. Subsequently, a plasticizer is added to the polymer and the hybrid carbon fibers with metal nanoparticles dispersed therein to form the polymeric nanocomposite film.

The plasticizer may include citrates, phthalates, lignosulphonates, or combinations thereof. Examples of the plasticizer include, but are not limited to, polyethylene glycol, propylene glycol, triethyl citrate, diethyl phthalate, dibutyl phthalate, dibutyl sebacate, or combinations thereof. Once the polymer is formed, the rotation of the stirrer is stopped and the polymer is casted on a substrate to form a polymeric nanocomposite film that can be used in a variety of applications such as a purification device. The polymeric nanocomposite film is vacuum dried at a suitable temperature such as about 50° C. to about 125° C. for any length of time such as about 6 hours to about 12 hours. Specific examples of time include about 6 hours, about 8 hours, about 10 hours, about 12 hours, and ranges between any two of these values (including endpoints).

EXAMPLES

The present invention will be described below in further detail with examples and comparative examples thereof, but it is noted that the present invention is by no means intended to be limited to these examples.

Example 1: Synthesis of a Polymeric Nanocomposite Film with Embedded Micro Channels A polymeric nanocomposite film with embedded micro channels having carbon fibers with metal nanoparticle dispersed therein was formed using the example system of FIG. 5. Here, vinyl acetate was esterified to form polyvinyl alcohol (PVA). A mixture of about 62% (w/w) of PVAc and about 99% (w/w) methanol obtained from S.D. Fine-Chem. Ltd., India was stirred in a container to prepare a reaction mixture. Subsequently, about 40 g of the formed mixture was transferred to the container 502. Here, the container 502 included a four-neck-round bottom glass assembly. The temperature of the container 502 was maintained at about 60° C. Moreover, about 25 ml of methanol and about 22.5 ml of methyl acetate were added to the mixture in the container 502. The mixture was mixed using the stirrer 508 at a speed of about 130 rpm until a transparent mixture was obtained.

To this mixture, about 10 ml methanolic sodium hydroxide (2.5% of sodium hydroxide (NaOH) dissolved in methanol) was added. After a time period of about 15 minutes, polymer formation was observed. Further, ball-milled hybrid carbon fibers that were prepared separately in SDS surfactant were added to the mixture.

The hybrid carbon fibers were formed using carbon microfibers and carbon nanofibers. The carbon fibers were formed by chemical vapor deposition. The metal catalysts used for chemical vapor deposition were iron (Fe), silver (Ag), or iron (Fe)-copper (Cu) bimetals. Here, about 4 grams (gm) of carbon microfibers and carbon nanofibers were randomly cut into small pieces having an average size of about 1 mm and were subsequently dispersed into about 120 ml of SDS and water (about 0.3% w/w) solution. The solution with the carbon fibers was transferred into a nano ball-mill from Retsch, Germany and was milled for about 4 hours at a speed of about 250 rpm using about 25 tungsten balls having a diameter of about 10 mm. This solution containing hybrid carbon fibers having an average diameter of about 300 nm was subsequently transferred to the mixture described above.

After about 45 minutes of adding the ball milled hybrid carbon fibers to the mixture, formation of a black gel was observed. Subsequently, about 100 ml of Milli-Q water was added to the mixture. Moreover, the temperature of the mixture was maintained at about 80° C. and the speed of the stirrer 508 was increased to about 150 rpm. Further, in about 2 hours of time, a black mixture was obtained. At this point, the temperature of the mixture was decreased to about 60° C., and the speed of the stirrer 508 was maintained at about 150 rpm.

Furthermore, about 5 ml of methyl acrylate and 0.1 g of potassium persulfate obtained from Merck, Germany were added to the mixture. Subsequently, after a time period of about 90 minutes, about 20 ml of acrylonitrile and about 0.1 g of potassium persulfate were also added to the mixture. The mixture was kept for a time period of about 6 hours and it was observed that the color of the mixture changed from black to blue. The heating device 506 was switched off and after about 90 minutes about 15 ml of PEG was added to the mixture. It was observed that after a time period of about 3 hours, a black slurry-like material was formed. The stirrer 508 was then stopped and the slurry was removed and was cast on a Teflon sheet using a thin film applicator. Next, the cast material was vacuum dried for about 8 hours in an oven at a temperature of about 110° C. to form a polymeric nanocomposite film.

A plurality of micro channels were formed in a surface of the polymeric nanocomposite film using a pulsed nanosecond ultraviolet laser. The ultraviolet radiation applied by the ultraviolet laser had a wavelength of about 248 nanometers (nm) and a pulse energy of about 309 milli joule (mJ). Further, the ultraviolet radiation applied by the ultraviolet laser had a pulse frequency of about 50 Hz and a scanning rate of about 0.5 mm/s. The polymeric nanocomposite film was used as a water purifier and was characterized as described below.

Figure 6:
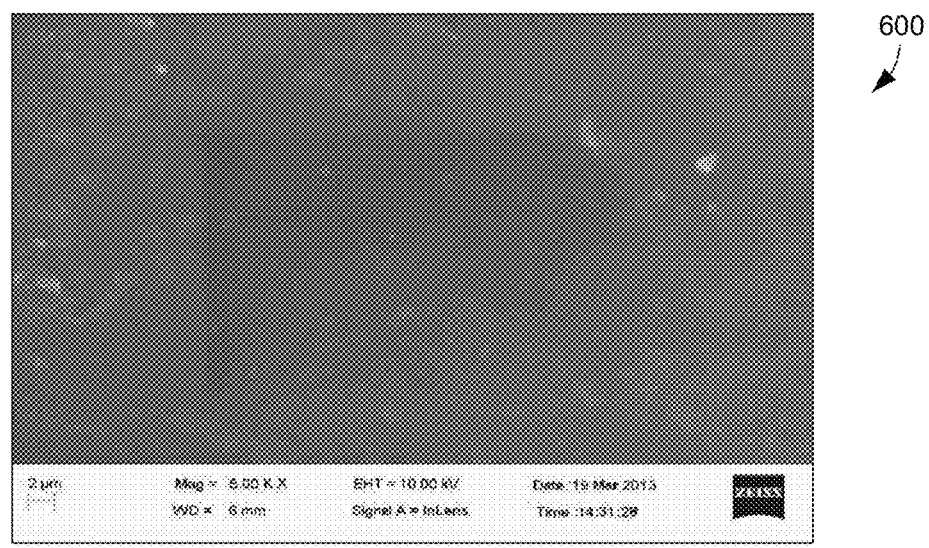
FIG. 6 illustrates example scanning electron microscopy (SEM) image of a polymeric nanocomposite film.

Example 2: Characterization of a Polymeric Nanocomposite Film with Embedded Micro Channels FIG. 6 is a scanning electron microscopy (SEM) image 600 of a polymeric nanocomposite film with embedded micro channels such as the polymeric nanocomposite film of Example 1. The polymeric nanocomposite film included PVA having hybrid carbon nanofibers with iron nanoparticles embedded therein. The surface morphology of the samples was observed using Supra 40 VP Field Emission scanning electron Microscopy (SEM) procured from Zeiss, Germany. The images were captured with a variable pressure secondary electron (VPSE) detector at an accelerating voltage of about 10 kV and a filament current of about 2.37 A at a working distance of about 6 mm to about 7 mm. As can be seen, the external surface of the polymeric nanocomposite film was observed to be substantially smooth.

Figure 7:
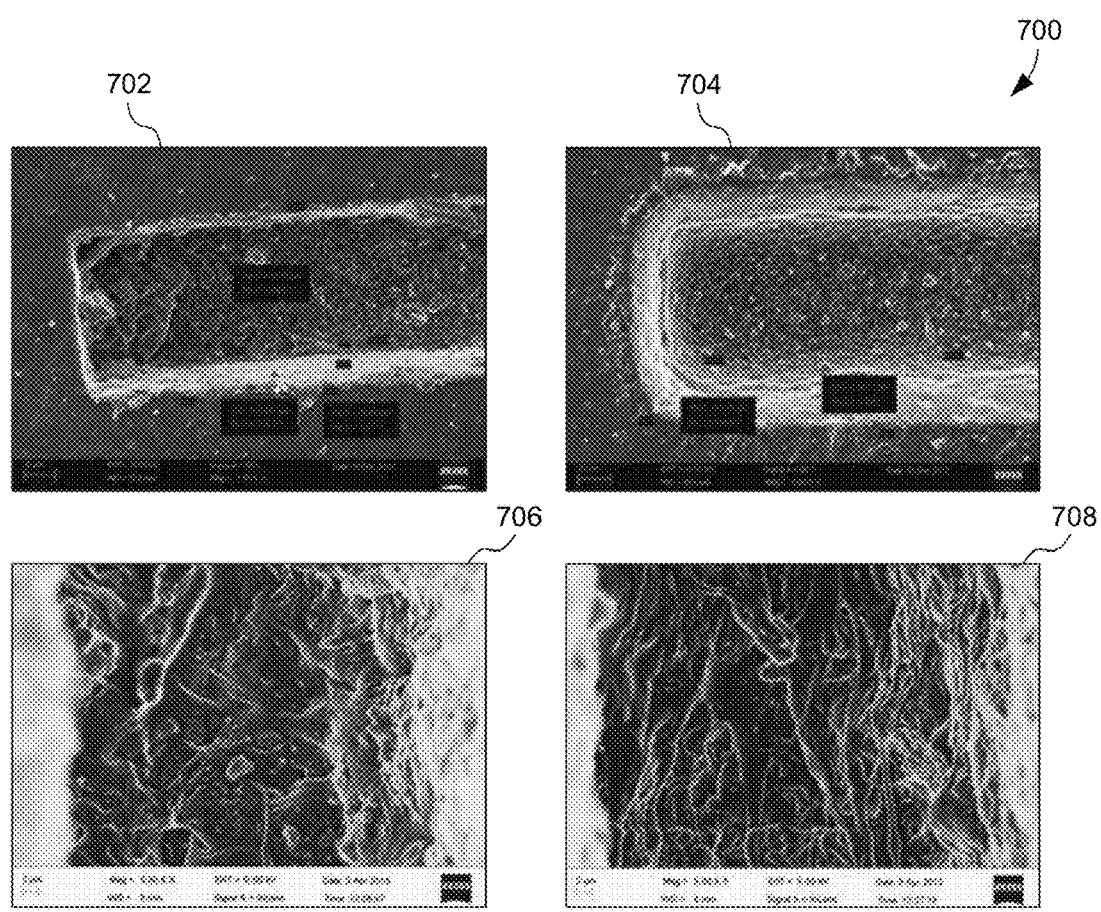
FIG. 7 illustrates example scanning electron microscopy (SEM) images of micro channels formed in a polymeric nanocomposite film.

FIG. 7 illustrates example scanning electron microscopy (SEM) images 700 of micro channels formed on a polymeric nanocomposite film. The polymeric nanocomposite film included PVA having hybrid carbon nanofibers with iron nanoparticles embedded therein. The SEM images are obtained at magnification of 1000× and 5000×. The SEM images of the polymeric nanocomposite film with the micro channels obtained at the magnification of 1000× are represented by reference numerals 702 and 704. Further, the SEM images of the polymeric nanocomposite film with the micro channels obtained at the magnification of 5000× are represented by reference numerals 706 and 708. As can be seen from the images 702, 704, 706 and 708, the walls of the micro channels formed on the polymeric nanocomposite were observed to be rough, amorphous and porous.

Figure 8:
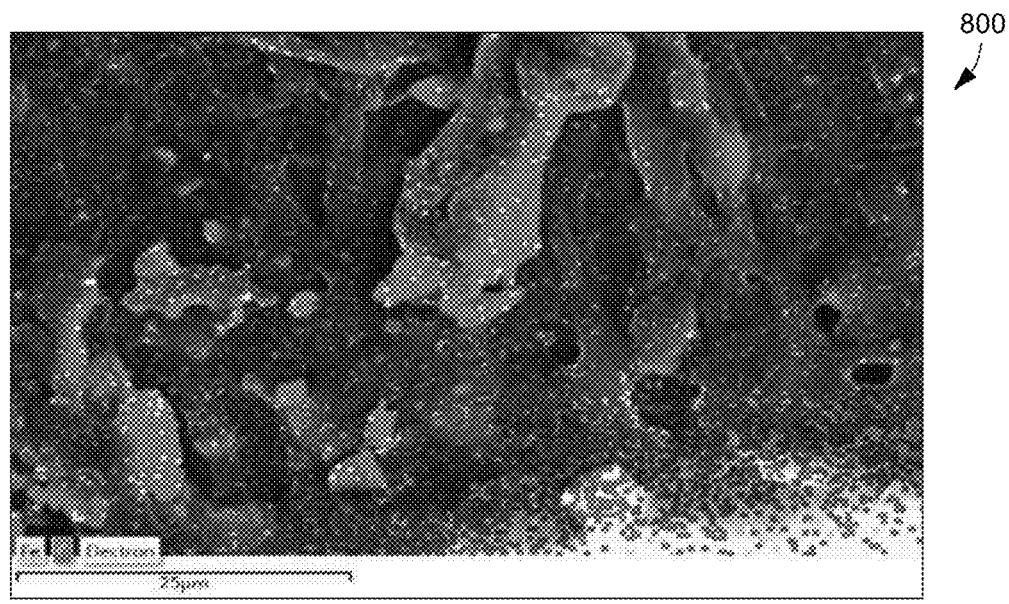
FIG. 8 illustrates an example energy dispersive X-ray spectrum (EDX) of the micro channels formed in a polymeric nanocomposite film.

FIG. 8 illustrates an example energy dispersive X-ray (EDX) spectra 800 of micro channels formed in the polymeric nanocomposite film of Example 1. The energy dispersive x-ray (EDX) was performed to detect the presence of the iron nanoparticles that were used as the CVD catalyst for forming carbon fibers. The carbon fibers were embedded in the polymeric material at the incipience of polymer formation. The EDX spectra 800 confirmed the presence of iron nanoparticles in the polymeric nanocomposite film.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of forming micro channels embedded in a polymeric nanocomposite film, the method comprising:
    combining one or more monomers to form a polymer;
    dispersing a plurality of carbon fibers comprising metal nanoparticles with a surfactant to form dispersed carbon fibers;
    milling the dispersed carbon fibers;
    mixing the milled carbon fibers prior to or concurrently with formation of the polymer from the monomers;
    adding at least one hydrophobic agent and at least one plasticizer to the polymer to form the polymeric nanocomposite film; and
    forming a plurality of laser-etched micro channels in a surface of the polymeric nanocomposite film.

2. The method of claim 1, wherein the one or more monomers comprises methyl acetate, vinyl acetate, methyl acrylate, ethyl acrylate, or combinations thereof.

3. The method of claim 1, wherein the polymer comprises polyvinyl alcohol (PVA), polyvinyl acetate (PVAc), polypropylene (PP), polyethylene (PE), polyvinylidene fluoride (PVDF), or combinations thereof.

4. The method of claim 1, wherein the micro channels have an average length of about 5 millimeter (mm) to about 30 mm.

5. The method of claim 1, wherein the micro channels have an average width of about 50 micrometer (μm) to about 300 μm.

6. The method of claim 1, wherein the micro channels have an average depth of about 40 micrometer (μm) to about 150 μm.

7. The method of claim 1, wherein the carbon fibers are added upon initiation of formation of the polymer.

8. The method of claim 1, wherein the carbon fibers comprise carbon microfibers, carbon nanofibers (CNFs), or a combination thereof.

9. The method of claim 1, further comprising:
casting the polymer on a substrate; and
drying the polymer to form the polymeric nanocomposite film.

10. The method of claim 1, wherein the metal nanoparticles comprise nickel (Ni), iron (Fe), silver (Ag), copper (Cu), zinc (Zn), aluminum (Al), gold (Au), Cu—Ag (copper-silver), Zn—Ag (zinc-silver), or combinations thereof.

11. The method of claim 10, wherein the metal nanoparticles have an average particle size of about 20 nanometer (nm) to about 180 nm.

12. The method of claim 1, wherein the micro channels are formed in the polymeric nanocomposite film using pulsed nanosecond ultraviolet laser.

13. The method of claim 12, wherein ultraviolet radiation applied by the ultraviolet laser has a wavelength of about 100 nanometer (nm) to about 400 nm.

14. The method of claim 12, wherein ultraviolet radiation applied by the ultraviolet laser has a pulse energy of about 1 millijoule (mJ) to about 700 mJ.

15. The method of claim 12, wherein ultraviolet radiation applied by the ultraviolet laser has a pulse frequency of about 1 Hertz (Hz) to about 60 Hz.

16. The method of claim 12, wherein ultraviolet radiation applied by the ultraviolet laser has a scanning rate of about 0.1 millimeter per second (mm/s) to about 1 mm/s.

17. A method of forming micro channels embedded in a polymeric nanocomposite film, the method comprising:
initiating esterification of vinyl acetate for forming polyvinyl alcohol (PVA);
dispersing a plurality of carbon fibers comprising metal nanoparticles with a surfactant to form dispersed carbon fibers;
milling the dispersed carbon fibers;
adding the milled carbon fibers to the vinyl acetate prior to or concurrently with formation of the polyvinyl alcohol (PVA);
adding at least one hydrophobic agent and at least one plasticizer to the PVA and the milled carbon fibers to form the polymeric nanocomposite film; and
forming a plurality of micro channels in a surface of the polymeric nanocomposite film.

* * * * *